(No Model.)
J. C. BROWN.
NUT LOCK.
No. 484,731. Patented Oct. 18, 1892.
Fig. I.
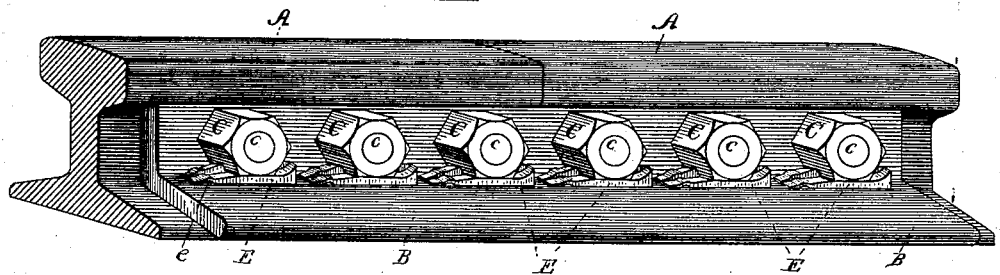
Fig. II.
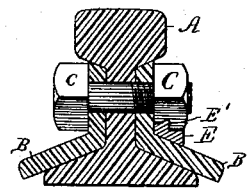
Fig. III.
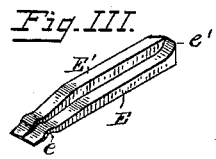
Fig. IV.
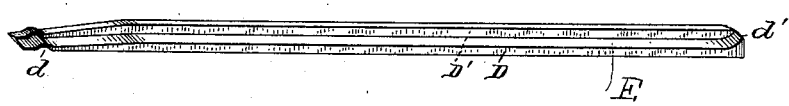
Fig. V.
Witnesses
James H. Lathy
E. H. Todd
Inventor
Julius C. Brown
By R. A. Balderson & Co.
His Attorneys
THE NORRIS PETERS CO., PHOTO-LITHO., WASHINGTON, D. C.

UNITED STATES PATENT OFFICE.

JULIUS C. BROWN, OF KANSAS CITY, MISSOURI, ASSIGNOR OF ONE-HALF TO THOMAS R. DAWE, OF SANTA BARBARA, CALIFORNIA.

NUT-LOCK.

SPECIFICATION forming part of Letters Patent No. 484,731, dated October 18, 1892.

Application filed June 3, 1892. Serial No. 435,392. (No model.)

*To all whom it may concern:*

Be it known that I, JULIUS C. BROWN, a citizen of the United States, residing at Kansas City, in the county of Jackson and State of Missouri, have invented certain new and useful Improvements in Nut-Locks for Railroad Fish-Plates, of which the following is a full, clear, and exact description, reference being had to the accompanying drawings, forming a part hereof.

My invention relates to improvements in nut-locks for railroad fish-plates; and my objects are, first, to provide and construct a nut-lock by forming a rabbet in the nut and providing a key with a shoulder or flange which will fit snugly in said rabbet, thereby locking the nut firmly, and at the same time will form a solid bearing for same, and, second, to provide and construct such a nut-lock with simplicity and economy, which objects I attain as shown in the accompanying drawings, used to illustrate my invention, in which—

Figure I is a perspective view of a section of rail composed of two shorter sections secured together by angular fish-plates and provided with my nut-locking device. Fig. II is a cross-sectional view of the same, showing more clearly the rabbet in the nut C and the key which secures same. Fig. III is a detail in perspective of the nut-locking key. Fig. IV is a detail in perspective of a modified form of said key, and Fig. V is a detail view of the rabbeted nut.

Referring to the drawings by letter, A represents a short section of rail formed of two sections, which are connected by fish-plates B B, which are secured rigidly thereto by bolts c and nuts C, as clearly illustrated. Said nuts C are provided with one or more rabbets c', in which the shoulders E' of keys E operate, as seen in Figs. I and II. The keys E are so constructed relative to the slant of the base of the fish-plate as to form solid bearings for said nuts C. The rabbets c' are formed on the inner edge of nuts C, and the shoulders E' of keys E are so constructed as to fit snugly therein, thus forming a secure lock for the nut and at the same time adding greater strength by reason of the solidity of the bearings thus formed.

D represents a modified form of the key, and this key is designed to be constructed sufficiently long to secure all the nuts used on one fish-plate. My preferred key, however, is that illustrated in Figs. I and III. The front ends of these keys E and D are flattened or beveled down and formed in the shape of a wedge, and the thin ends are provided with springs e and d, which are to prevent the keys from working out of place after they have been forced in position under the nuts. The opposite ends of said keys are provided with heels e' and d', which prevent same from working forward when used on inclined tracks. The keys E are so beveled as to entirely fill the space between the nuts C and fish-plate B, as shown in Fig. II.

The nuts C may be provided with one or more rabbets C', which may be slightly beveled, as shown in Fig. V, or cut in straight, as may be desired.

In using my nut-lock I proceed as follows: The track being laid in the ordinary manner, I secure the fish-plates in position by using the bolts c and nuts C, and after screwing the nuts tightly on, but leaving each of them in such a position that the slot c' is directly under the bolt and parallel with the fish-plate, I place the keys in position and force them under the nuts, thereby locking them so that they cannot be tightened or loosened until said key shall have been removed.

The keys may be formed in the shape of springs, having their ends to rest on the fish-plate and raised in the center, so as to press up under the nut, the point which rests under said nut being provided with a slight bend to hold same in position.

Having thus fully described my invention, what I claim, and desire to secure by Letters Patent, is—

The combination of the bolt and nut C, having the rabbets c', key E, having raised part E' to fit in said rabbet, enlarged heel e' and spring e at the opposite extremity from the heel, and fish-plate having a flange to fit under said key to keep it up in said rabbet, substantially as shown and described, and for the purposes set forth.

In testimony whereof I affix my signature in presence of two witnesses.

JULIUS C. BROWN.

Witnesses:
  JAMES K. LATHY,
  P. YOUNG.